E. L. DELACOUR.
TRANSMISSION MECHANISM.
APPLICATION FILED AUG. 13, 1913.
1,191,771.
Patented July 18, 1916.
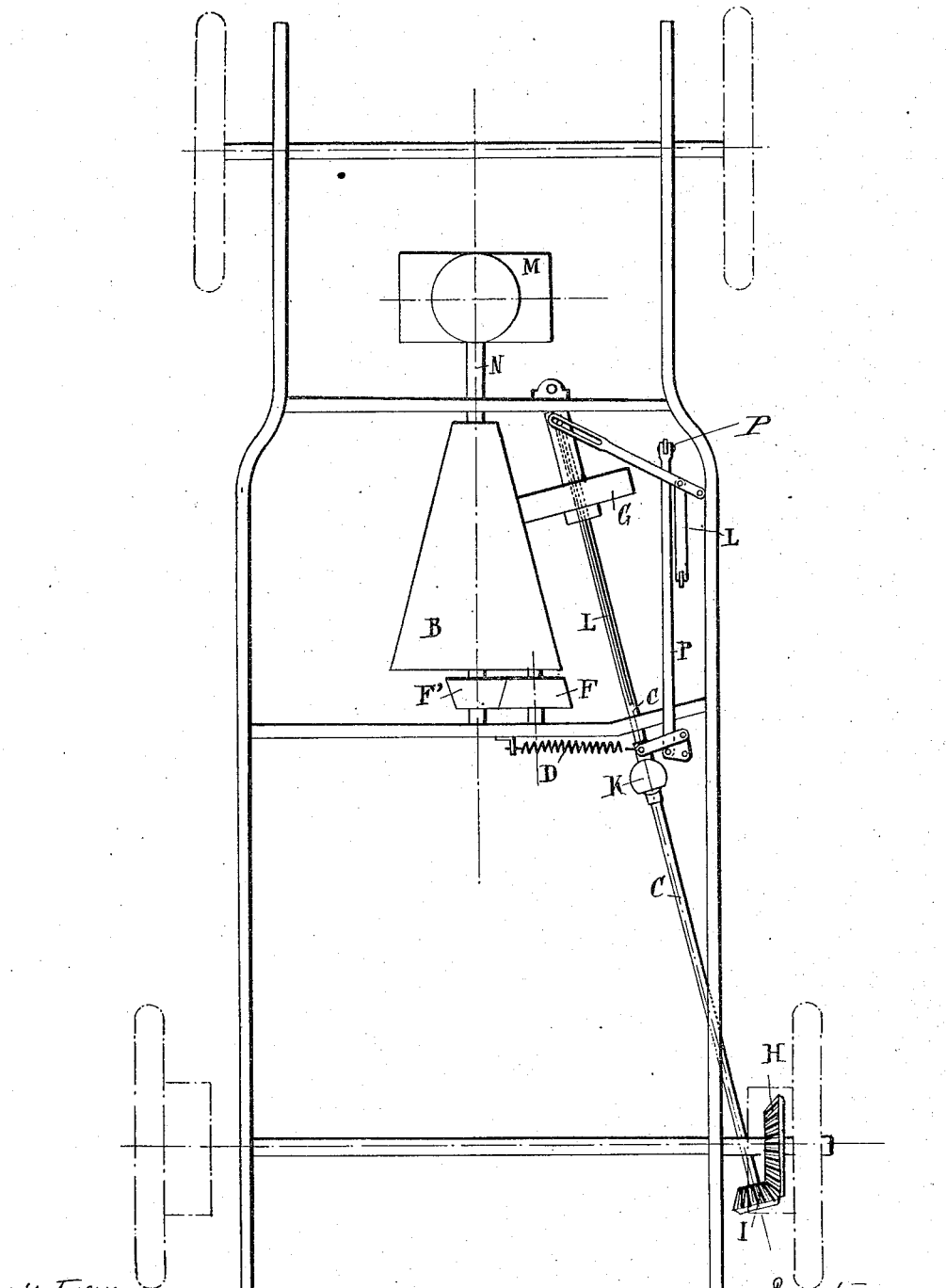

UNITED STATES PATENT OFFICE.

EDOUARD LUDOVIC DELACOUR, OF PARIS, FRANCE.

TRANSMISSION MECHANISM.

1,191,771.  Specification of Letters Patent.  Patented July 18, 1916.

Application filed August 13, 1913. Serial No. 784,638.

*To all whom it may concern:*

Be it known that I, EDOUARD LUDOVIC DELACOUR, 19 Rue de la Lancette, Paris, France, a citizen of France, have invented certain new and useful Improvements in Transmission Mechanism, of which the following is a specification.

This invention relates principally to a method of controlling motor vehicles without the use of gear boxes. By means of certain simple and strong parts the driving gear can be thrown into and out of action, the speed varied progressively within wide limits and reversing effected.

The accompanying drawing illustrate diagrammatically, by way of example, a plan view of a motor car chassis provided with the simplified mechanism which forms the object of the invention.

A truncated cone B is mounted on the shaft A of the motor M, and parallel with the generating line of this truncated cone, a shaft C provided with a Cardan joint K is arranged. One end of this shaft is fixed at a suitable point on the chassis and at the other end is a bevel pinion I which meshes with a bevel wheel H firmly connected with one of the rear wheels of the car.

A friction disk G having a feather movable in a groove E in the shaft C is acted upon by a spring D which insures the contact of this disk G either with the cone B or with another friction cone F, the latter being itself in engagement with a cone F' keyed on the motor shaft A or otherwise driven from this shaft. By operating a suitable mechanism such as a pedal P, or the like, the disk G is moved away from the cone B and thus the driving gearing of the vehicle thrown out of action. By another mechanism such as a lever L, the disk G can be displaced along the shaft C.

Thus any desired speed may be obtained intermediate between the lowest speed obtained when the disk G is in proximity to the smaller end of the truncated cone B, and the highest speed obtained when this disk has been moved to the larger end of the cone B. Finally, by bringing the disk G against the cone F a supplementary transmission mechanism is brought into action which causes the reversing of the car.

A characteristic point of the arrangement is that the shaft C being held at its end by the spring D enables, at the lowest speed, the highest pressure to be obtained which is desirable in view of the effort required for climbing hills. When in order to increase the speed the disk G is shifted toward the larger end of the cone B, the length of the two arms of the lever tend to be equalized, and the pressure of the disk G on the cone B is reduced, which is quite satisfactory since the acceleration has already been effected, and all that is necessary is to maintain the speed.

Having thus described my invention, what I claim as new is:

1. In transmission mechanism, the combination of a driving shaft, a conical gear member mounted upon said shaft, a jointed driven shaft extending parallel to the generating line of the gear member aforesaid, a gear element shiftable along said driven shaft, to obtain a variation of speed, tension means connected to the driven shaft and normally tending to move the same laterally to maintain the shiftable gear element in coaction with the conical gear member for transmission of motion to the driven shaft, and lever means for shifting the driven shaft laterally against the tension aforesaid to move the gear element away from the gear member.

2. In transmission mechanism, the combination of a driving shaft, a conical gear member mounted upon said shaft, a movable driven shaft extending parallel to the generating line of the gear member aforesaid, a universal joint intermediate the length of the driven shaft, a lever operably connected to the jointed portion of the driven shaft, a gear element shiftable along said driven shaft, and a spring connected to the driven shaft adjacent to the universal joint and normally tending to move a section of said shaft on which the shiftable gear element is mounted toward the conical gear member whereby to maintain the shiftable gear element in coaction with the said conical gear member.

3. A transmission mechanism for motor vehicles including a frame and driving wheels, comprising in combination, a driving shaft, a conical gear element mounted upon said shaft, a driven shaft extending parallel to the generating line of the gear member aforesaid, said shaft being arranged diagonally upon the frame whereby to bring one end thereof contiguous to a driving wheel for the vehicle, a joint for said driven shaft disposed intermediate its length to permit lateral movement of the jointed portion, a gear element shiftable along said driven shaft, means for maintaining said shaft sections in alinement and the gear element in coöperation with the conical gear member, and means operably connected to the jointed portion of the shaft for moving the same laterally and the gear element out of coöperation with the conical gear member.

In witness whereof I have hereunto signed my name in the presence of two subscribing witnesses, this twenty-eighth day of July, 1913.

EDOUARD LUDOVIC DELACOUR.

Witnesses:
ANTOINE MONKEILHET,
LUCIEN MEMMINGER.